United States Patent [19]

Hosoi

[11] Patent Number: 5,181,811
[45] Date of Patent: Jan. 26, 1993

[54] DRILL AND DRILL GRINDING METHOD AND APPARATUS

[76] Inventor: Toshiaki Hosoi, 9-10, Kamiminami 5-chome, Hiranoku, Osaka-shi, Osaka-fu, Japan

[21] Appl. No.: 371,469

[22] Filed: Jun. 26, 1989

[30] Foreign Application Priority Data

Jul. 4, 1988 [JP] Japan .............................. 63-167479

[51] Int. Cl.$^5$ ............................................ B23B 51/02
[52] U.S. Cl. .................................... 408/230; 76/108.6
[58] Field of Search ............................ 408/227–230, 408/59, 715; 76/108.6

[56] References Cited

U.S. PATENT DOCUMENTS

| | | | |
|---|---|---|---|
| 2,778,252 | 1/1957 | Oxford, Jr. | 408/230 |
| 2,936,658 | 5/1960 | Riley | 408/230 |
| 4,222,690 | 9/1980 | Hosoi | 408/230 |
| 4,373,839 | 2/1983 | Negishi et al. | 408/59 |
| 4,556,347 | 12/1985 | Barish | 408/230 |
| 4,583,888 | 4/1986 | Mori et al. | 408/230 |
| 4,688,972 | 8/1987 | Kubota | 408/230 |
| 4,756,650 | 7/1988 | Wakihira et al. | 408/227 X |

FOREIGN PATENT DOCUMENTS

3619245 3/1987 Fed. Rep. of Germany .
1426873 4/1966 France .
2382965 11/1978 France .............................. 408/230

Primary Examiner—Steven C. Bishop
Attorney, Agent, or Firm—Jordan and Hamburg

[57] ABSTRACT

A drill having a pair of cutting edges formed at one end of a shank and arranged symmetrically with respect to a point, each cutting edge comprising a central edge portion and an outer edge portion, the central and outer edge portions each extending substantially straight and being joined to each other with an obtuse angle formed therebetween when seen from below, the central edge portion being formed with a central face substantially parallel to the axis of the drill, the land portion of the two edge portions having a top face joined to the central face of the central edge portion and curved in a direction to give a large area to the central face; a method of grinding the drill with the outer periphery and a side surface of a rotary grinder; and a drill grinding apparatus for practicing the method comprising a holding frame for reciprocatingly moving the drill axially thereof, means for rotating the drill, a disklike rotary grinder, and posture changing means for altering the angle between the grinding portion of the grinder and the drill.

14 Claims, 8 Drawing Sheets

DRILL AND DRILL GRINDING METHOD AND APPARATUS

BACKGROUND OF THE INVENTION AND RELATED ART STATEMENT

The present invention relates to drills having twisted flutes in the shank and to a method of and an apparatus for grinding the drill.

The problems encountered with the so-called twist drill having twisted flutes in its shank are generally concerned with cutting ability and chip discharge-ability. If the drill is caused to cut workpieces more powerfully, a correspondingly increased amount of chips are produced. When the chip discharging flutes are not sufficiently large, chips will bite the work inner surface defining the bore formed or clog up the flutes to make the drill unable to continue its operation. The chip discharging flutes, if sufficiently large-sized, correspondingly reduce the rigidity of the shank, making the drill unable to perform a powerful cutting operation.

Usual drills are formed with a chisel positioned approximately at the center of rotation and having a large negative rake angle, so that this portion almost effects a pushing action rather than cutting, consequently offering a large proportion of resistance to the cutting operation of the drill.

To improve the low cutting ability of the drill at its central portion, Transaction of the ASME February 1957), for example, proposes providing central cutting edge portions at the position where the chisel is formed. Stated more specifically with reference to FIGS. 10 and 11, a drill 1a is provided at one end with a pair of cutting edges 2a arranged symmetrically about a point. The cutting edge 2a comprises a central edge portion 21 and an outer edge portion 22 each of which is straight. The central edge portion 21 has a central face 25 parallel to the axis of the drill 1a.

Figure 10:
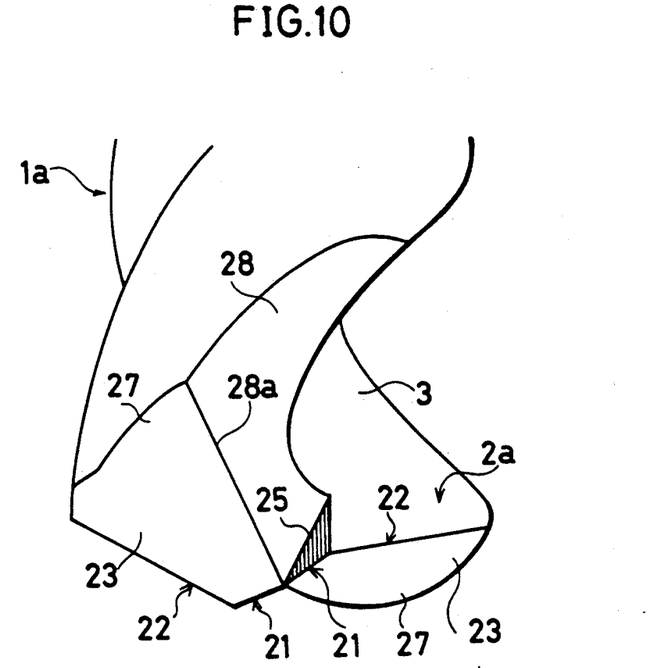
FIG. 10 is a perspective view of a conventional drill.
Figure 11:
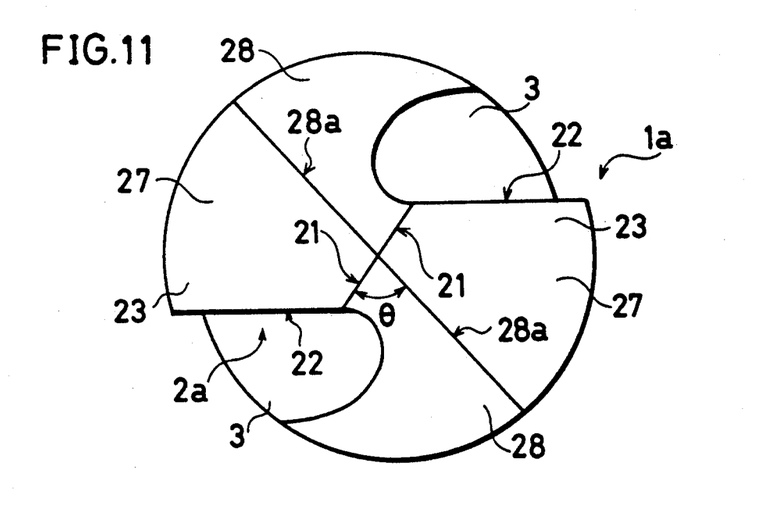
FIG. 11 is a bottom view of the same.

A first land portion 27 is formed on the rear side of the flank 23 of the edge portions 21, 22 with respect to the direction of rotation, and a second land portion 28 is formed on the rear side of the land portion 27 with respect to the direction of rotation. Since the first land portion 27 is subjected to the resistance offered to the edge portions 21, 22 during cutting, the first land portion 27 has a relatively gentle inclination (close to a direction perpendicular to the drill axis), while the second land portion 28 has a steep inclination (close to the axial direction of the drill) so that the central face 25 can be formed.

Thus, the gently sloping land portion 27 is formed to assure the cutting edge portions 21, 22 of rigidity, whereas if the overall land portion is given such an inclination, the central edge portion 21 has a very small cutting face and fails to cut workpieces satisfactorily, so that the steep land portion 28 is formed beyond a ridge line 28a to provide the large central face 25. Indicated at 3 are chip discharging flutes formed helically in the shank.

With the above construction, the furrow for discharging therethrough the chip produced by the central edge portion 21 is formed between the central face 25 and the ridge line 28a at the boundary between the first and second land portions 27, 28. The furrow has a small opening angle $\theta$ of up to 90 degrees when seen from below and is therefore low in chip dischargeability. Thus, the drill central portion still remains to be fully improved in cutting ability. Moreover, the second land portion 28 is slanted steeply (nearly along the axis of the drill) to provide the central face 25, with the result that the outer periphery is greatly cut out to decrease the rigidity of the shank.

Although attempts are made to afford improved cutting ability by minimizing the width of the chisel, for example, by web thinning, the methods heretofore used have the drawback of failing to achieve improvements in the cutting ability of drills because the chips produced at the central portion are not satisfactorily dischargeable or because the central edge portions are insufficient in strength to render the drill unusable for a powerful cutting operation.

SUMMARY OF THE INVENTION

The present invention has been accomplished to overcome the foregoing drawbacks of the prior art.

An object of the invention is to provide a drill which is formed at its central portion with cutting edges of high strength to give improved cutting ability to the central portion and which is adapted to smoothly discharge the chips produced at the central portion.

Another object of the invention is to provide a method of and apparatus for grinding the drill accurately and easily.

The drill of the present invention comprises a pair of cutting edges formed at one end of a shank and arranged symmetrically with respect to a point, each of the cutting edges comprising a central edge portion and an outer edge portion, the central edge portion and the outer edge portion each extending substantially straight and being joined to each other with an obtuse angle formed therebetween when seen from below, the central edge portion being formed with a central face substantially parallel to the axis of the drill, the land portion of the two edge portions having a top face joined to the cutting face of the central edge portion and curved in a direction to give a large area to the cutting face.

Preferably, the angle formed between the outer edge portion and the central edge portion at their junction is in the range of 110 to 150 degrees. Preferably, the curved face of the land portion forms a substantially conical peripheral surface having its vertex positioned at the center of the drill tip.

The present invention further provides a method of grinding a drill with a rotary grinder in the form of a disk, the drill having a pair of cutting edges formed at one end of a shank and arranged symmetrically with respect to a point, the shank being formed with flutes for discharging therethrough the chips produced by the cutting edges. The method comprises the first step of grinding the flank of each cutting edge, the second step of grinding a land portion continuous with the flank, and the third step of grinding the portion where the land portion is joined to the central portion of the cutting edge, the rotary grinder being held in a first inclined position in the first step to grind the flank with the outer periphery of the rotary grinder, the rotary grinder being held in a second inclined position in the second step to grind the land portion with the outer periphery of the rotary grinder, the drill being rotated from the second inclined position to cause the rotary grinder to grind the land portion with its outer periphery and to grind the central face of the central portion of each cutting edge with a side surface of the grinder.

The rotary shaft of the rotary grinder may be positioned perpendicular to the axis of the drill, with the outer periphery of the grinder inclined with respect to the rotary shaft. Alternatively, the rotary shaft of the rotary grinder may be inclined from a direction perpendicular to the axis of the drill, with the outer periphery of the grinder formed in parallel to the rotary shaft.

The present invention further provides an apparatus for grinding a drill comprising a holding frame reciprocatingly movable axially of the drill to be ground, a drill chuck rotatably supported by the holding frame, means for rotating the drill chuck about the axis of the drill within a specified angle of rotation, a rotary grinder in the form of a disk and positionable at the end portion of the drill as held by the drill chuck, and posture changing means supporting the rotary grinder for altering the angle between the axis of the drill and a line tangent to the outer periphery of the grinder at its grinding portion.

Preferably, the rotating means is provided with reduction means for transmitting a torque on a speed reduction.

With the drill of the invention, the chip produced by each central edge portion can be smoothly discharged to the cutting face of this edge portion and the curved face which is recessed. This results in improved cutting ability. The drill is usable for a powerful cutting operation since each central edge portion has high strength. The drill can be ground accurately and easily by the grinding method stated above using the above grinding apparatus which is simple in construction.

BRIEF DESCRIPTION OF THE DRAWINGS

FIG. 5 (a) is a diagram illustrating how a chip grows;

FIG. 5 (b) is a perspective view of the chip;

DESCRIPTION OF THE PREFERRED EMBODIMENTS

Figure 1:
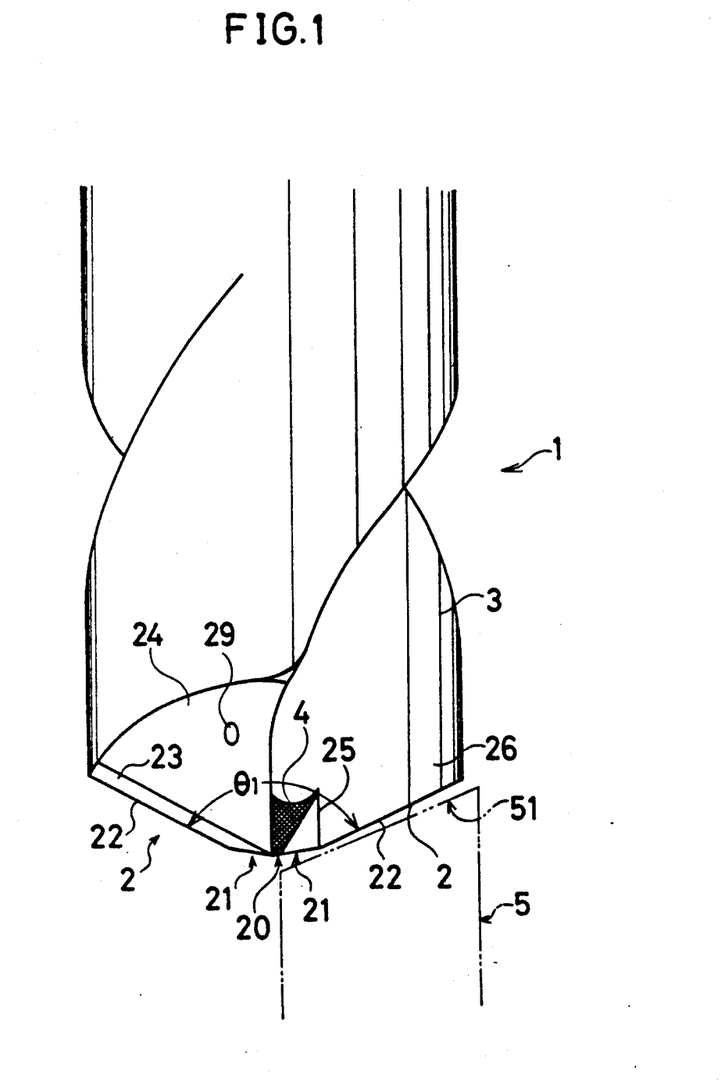
FIG. 1 is a front view of a drill embodying the invention.
Figure 2:
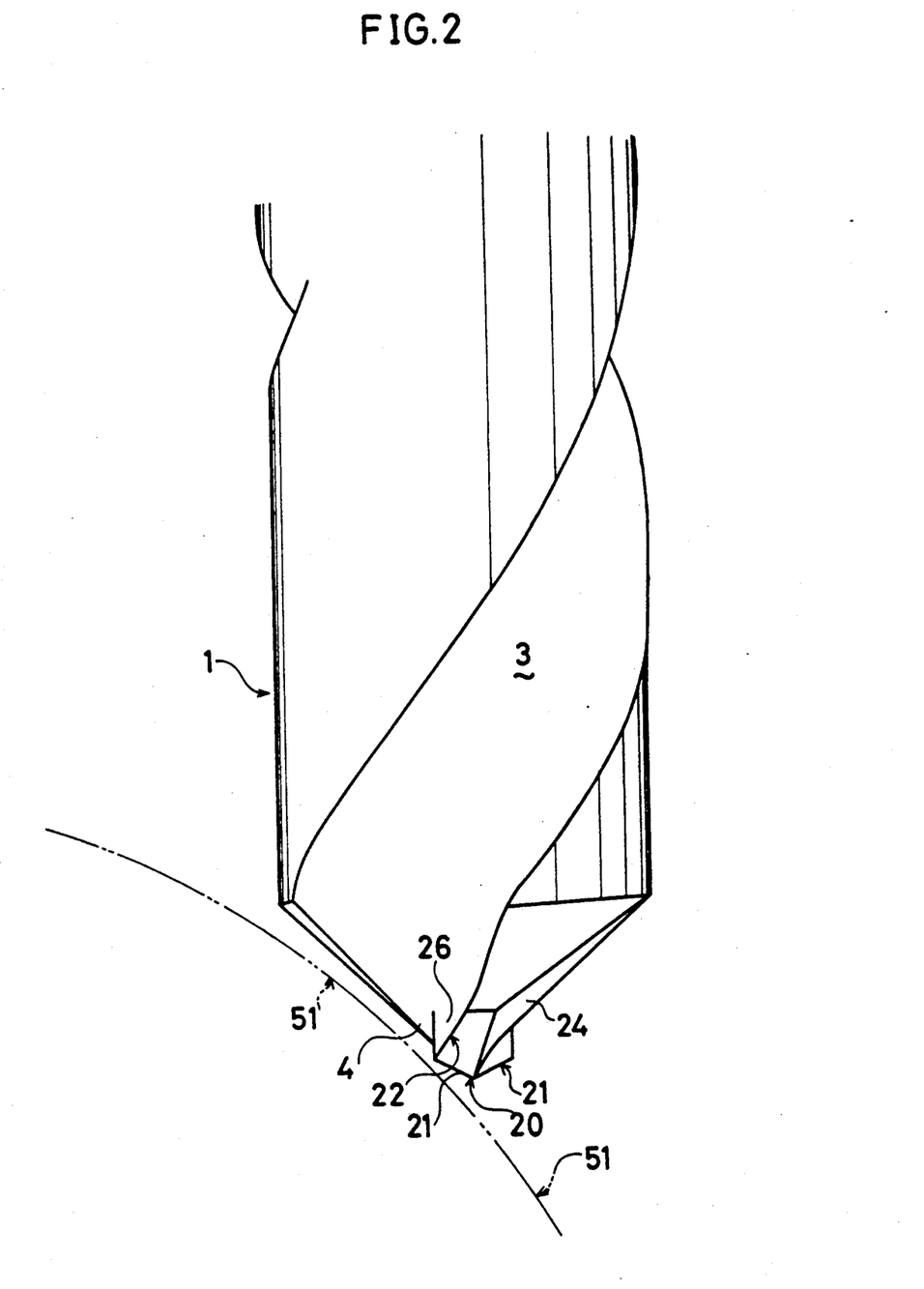
FIG. 2 is a side elevation of the same.
Figure 3:
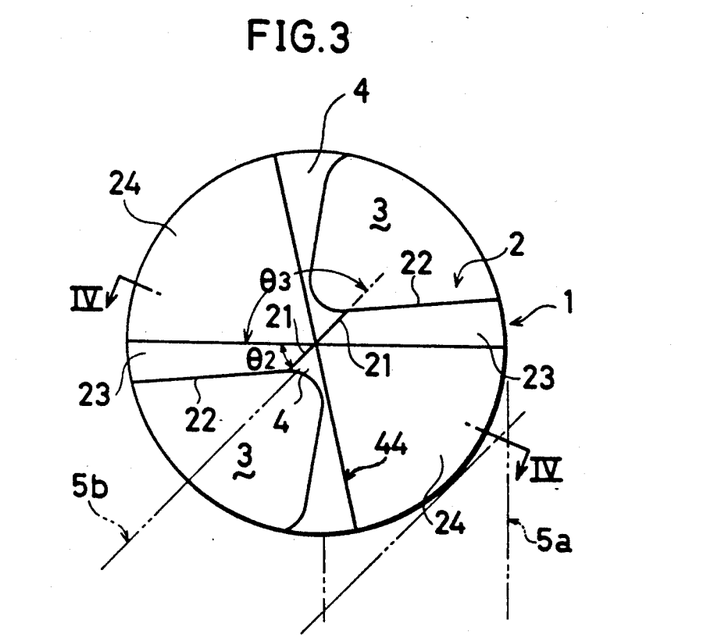
FIG. 3 is a bottom view of the same.

With reference to FIGS. 1 to 3, a drill 1 is formed at one end with a pair of cutting edges 2 arranged symmetrically with respect to a point. Each of the cutting edges 2 comprises a central edge portion 21 and an outer edge portion 22 continuous therewith. When seen from below, the central edge portion 21 and the outer edge portion 22 each extend substantially straight and are joined to each other with an obtuse angle (of greater than 90 degrees) formed therebetween. This angle $\theta 3$, which is 135 degrees in the illustrated embodiment, is 110 to 150 degrees, preferably 120 to 130 degrees, more preferably 125 degrees +2 degrees. Each chip discharge flute 3 has at its lower end a cutting face 26. The outer edge portion 22 is formed at the junction of the cutting face 26 and a flank 23.

The central edge portion 21 and the outer edge portion 22 are perfectly straight in the case of the illustrated embodiment but may be somewhat curved. The outer edge portion 22 is in conformity with the shape of bottom of the flute 3 and is therefore usually slightly curved. The tip angle 81 of the drill 1 is in the range of 130 to 140 degrees.

A land has a first land portion 24 and a second land portion 4 on opposite sides of a demarcation line 4. The second land portion 4 is hereinafter referred to as a recessed land portion or a recessed portion. The portion 24 is formed on the rear side of the flank 23 of the edge portions 21, 22 with respect to the direction of rotation. Since the land portion 24 is subjected to the cutting resistance offered to the edge portions 21, 22, the land portion 24 has a relatively gentle inclination (sloping close to a direction perpendicular to the axis of the drill 1). A cooling oil supply port 29 is formed in the land portion 24.

At the position where the land portion 24 of the two edge portions 21, 22 is joined to the central face 25 of the central edge portion 21, the land portion 24 has a recessed portion 4 curved in a direction to give a large area to the central face 25. The central face 25 of the central edge portion 21 is substantially parallel to the axis of the drill as shown in FIG. 4.

The recessed portion 4 extends from the juncture line 44 to the central face 25.

Figure 4:
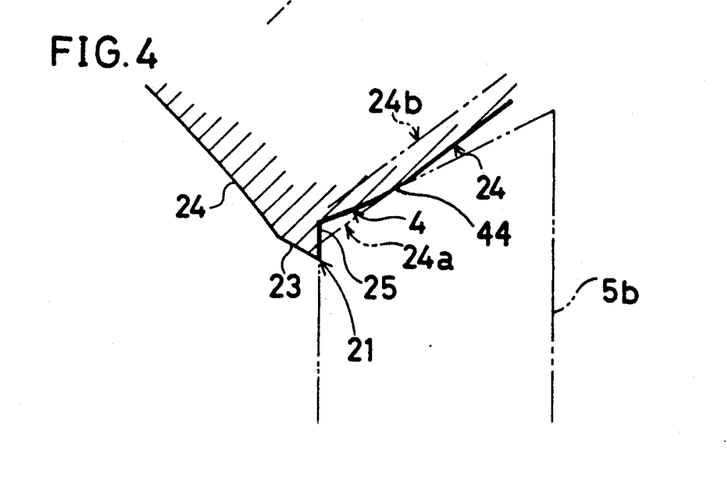
FIG. 4 is a view in section taken along the line IV—IV in FIG. 3.

When the recessed portion 4 is not formed, the land portion 24 extends along a phantom line 24a as seen in FIG. 4, greatly diminishing the central face 25. If the land portion is so formed as to make the central face 25 large, the land portion 24 will be greatly cut away as indicated by a phantom line 24b to lower the rigidity of the edge portions 21, 22.

Figure 6:
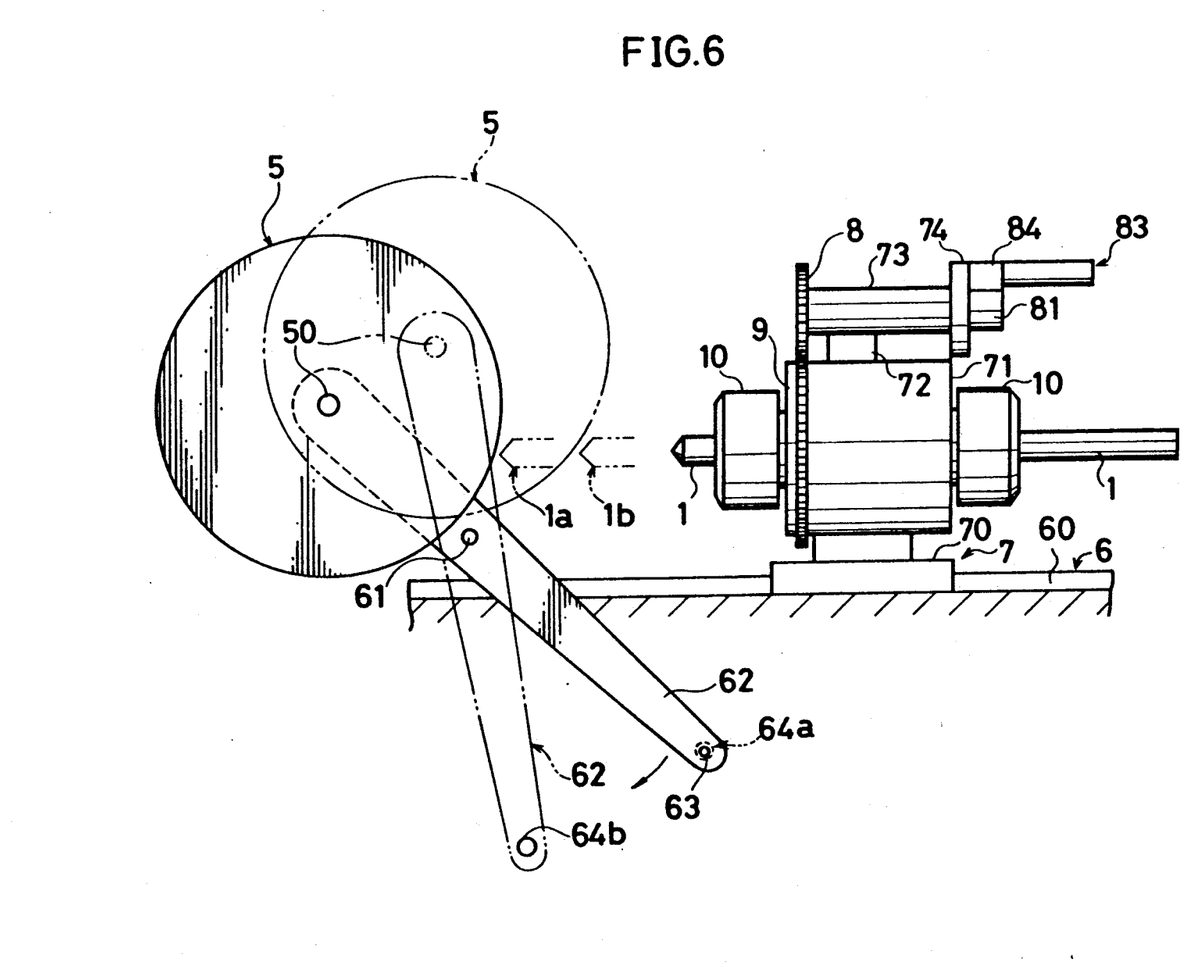
FIG. 6 is a front view of a grinding apparatus embodying the invention.
Figure 7:
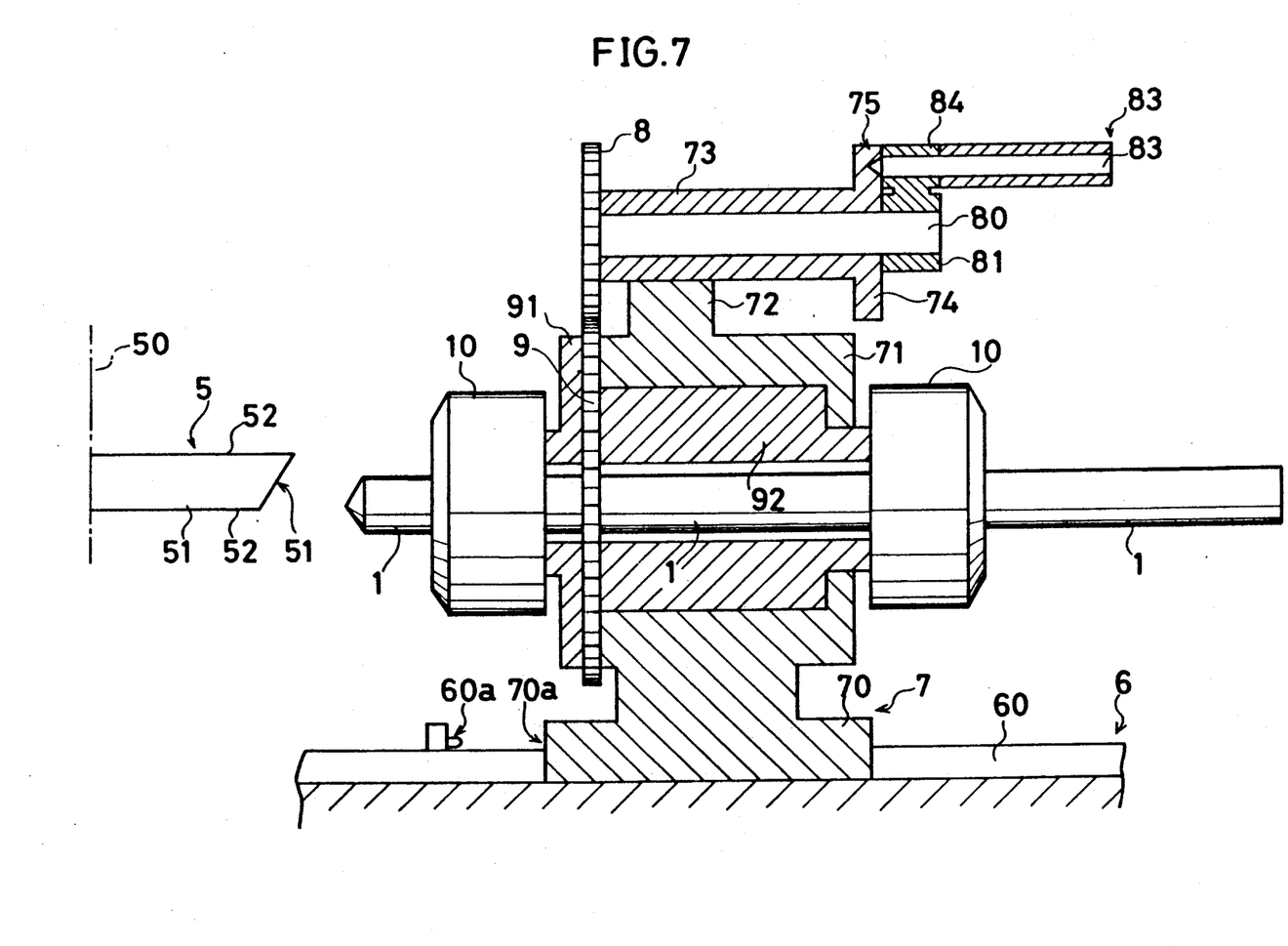
FIG. 7 is a view in vertical section of the same.
Figure 8:
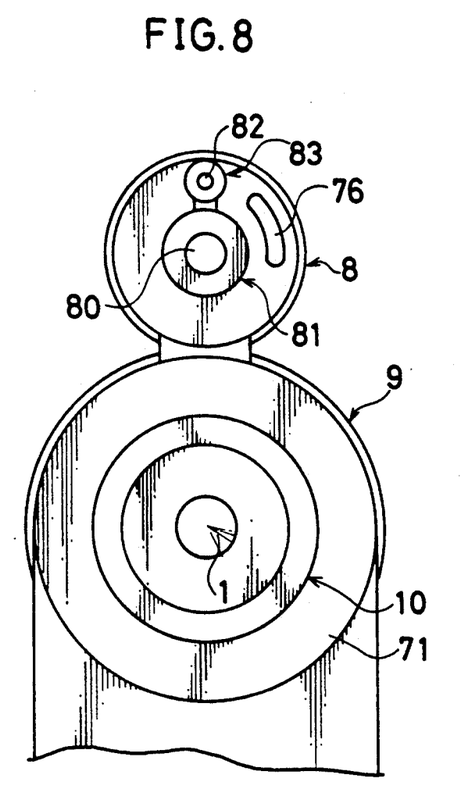
FIG. 8 is a left side elevation of the same.

FIGS. 6 to 8 show an apparatus embodying the invention for grinding the drill 1. The grinding apparatus comprises a holding frame 7 reciprocatingly movable along a guide groove 60 formed in the upper surface of the body 6 of the apparatus, a pair of drill chucks 10 mounted on the holding frame 7, means for rotating the drill chucks 10 about the axis of the drill 1 within a specified angle of rotation, and a rotary grinder 5 positionable at the end portion of the drill 1 as held by the chucks 10. A stopper 60a is provided in the vicinity of the guide groove 60. At the position where the end of the drill 1 to be ground is brought into contact with the rotary grinder 5 by advancing the holding frame 7, the front end face 70a of the frame 7 comes into contact with the stopper 60a, whereby the drill is ground by a predetermined amount.

The holding frame 7 is reciprocatingly movable along the guide groove 60 with its base portion 70 fitted in the groove 60. A hollow cylinder 92 is rotatably supported by a holding portion 71 above the base portion. The cylinder 92 has one of the drill chuck 10 mounted on its rear portion and a driven gear 9 attached to its front portion. The other drill chuck 10 is attached by a flange 91 to the front side of the driven gear 9. A tubular member 73 is mounted on the upper portion of the holding portion 71 by a connecting member 72. A shaft 80 rotatably extending through the tubular member 73 has a drive gear 8 attached to its front end. The drive gear 8 is in mesh with the driven gear 9.

The tubular member 73 is formed with a flange 74 at its rear end. A sleeve 81 secured to the rear end of the shaft 80 has an arm 84 having attached thereto a handle 83 projecting rearward. The handle 83 has an operating rod 82 the front end of which extends through the arm 84 and fits in a cavity 75 formed in the flange 74, whereby the sleeve 81 and the shaft 80 are prevented from rotation. As seen in FIG. 8, the flange 74 is formed with a circular-arc guide groove 76 along the path of revolution of the operating rod 82. The rod 82 is movable axially thereof by suitable unillustrated means.

The handle 83, the drive gear 8, the driven gear 9, etc. provide the rotating means. More specifically, the operating rod 82 is retracted axially thereof to disengage its front end from the cavity 75 with the hand grasping the handle 83, the rod end is then fitted in the guide groove 76, and the rod 82 is moved within the specified range of revoltuion, whereby the shaft 80 can be rotated. The drive gear 8 rotates with the shaft 80 to rotate the driven gear 9, whereby the drill chucks 10 connected to the gear 9 are rotated.

The drive gear 8 and the driven gear 9 are in the ratio of 1:2 in the number of teeth, whereby the speed of rotation of the shaft 80 is reduced to one-half. This assures accurate rotation when the drill is ground.

The rotary grinder 5 is in the form of a disc and has a rotary shaft 50 which is supported by the forward end of a support arm 62 as shown in FIG. 6. The support arm 62 is rotatably supported by a pivot 61 attached to the apparatus body 6. A lock pin 63 attached to the base end of the support arm 62, and engaging bores 64a, 64b formed in the body 6 provide the posture changing means. The support arm 62 is rotatable about the pivot 61 to the solid-line position or the phantom-line position in FIG. 6 and can be locked in either one of these positions by the engagement of the pin 63 in one of the bores 64a, 64b, whereby the rotary grinder 5 can be held in two inclined postures, i.e. the solid-line position (first inclined position) and the phantom-line position (second inclined position). The rotary grinder 5 is driven about the rotary shaft 50 by unillustrated drive means.

The drill 1 is ground by the following method using the above apparatus. First, the chucks 10 are caused to hold the drill 1 as illustrated, the lock pin 63 is engaged in the bore 64a to hold the rotary grinder 5 in the first inclined position indicated in the solid line in FIG. 6, and the grinder 5 is rotated by the unillustrated drive means. The holding frame 7 is then advanced along the guide groove 60 to grind the flanks in the first step. In this first step, the grinder 5 has its shaft 50 positioned perpendicular to the axis of the drill as seen in FIG. 1, with the drill 1 held by the chucks 10 against rotation, and the outer periphery of the grinder 5 is brought into contact with the flank 23 of one of the cutting edges of the drill circumferentially of the drill 1 to grind the flank. The amount by which the drill is cut away by this grinding operation is regulated by the front end face 70a of the holding frame 7 coming into contact with the stopper 60a (see FIG. 7).

After one of the flanks 23 has been ground, the holding frame 7 is slightly retracted, the front end of the operating rod 82 is disengaged from the cavity 75 in the flange 74 by pulling the handle 83 axially thereof, the handle 83 is revolved about the shaft 80 one turn, and the front end of the rod 82 is engaged in the cavity 75 again. The revolution of the handle 83 rotates the shaft 80 and the drive gear 8 which are connected thereto, whereby the driven gear 9 and the drill 1 rotatable therewith are rotated through 180 degrees. The holding frame 7 is then advanced again to grind the other flank 23 in the same manner as above.

In the next second step, the land portions are ground. In this step, the lock pin 63 is removed from the bore 64a, the arm 62 is rotated about the pivot 61, and the pin 63 is engaged in the bore 64b, whereby the rotary grinder 5 is held in the second inclined position indicated in the phantom line in FIG. 6. The grinder 5 is then rotated. With reference to FIG. 2, the grinder 5 has its shaft 50 positioned perpendicular to the axis of the drill 1, and the outer periphery 51 of the grinder 5 is brought into contact with the land portion 24 of one of the cutting edge of the drill 1 circumferentially of the drill 1 to grind the land portion.

For the above grinding operation, the front end of the operating rod 82 is removed from the cavity 75 of the flange 74 by pulling the handle 83 axially thereof and is then fitted in one end of the guide groove 76. The rod 82 is then moved along the guide groove 76 to rotate the shaft 80 through the specified range determined by the groove 76. The drill 1 is therefore rotated through one-half of this range. During the rotation, the grinder 5 grinds the land portion 24, the recessed portion 4 and the central face 25.

More specifically stated with reference to FIGS. 3 and 4, the grinder 5 comes into contact with the land portion 24 in the state indicated by a line 5a. In this state, the drill 1 rotates counterclockwise in FIG. 3 and also advances, whereby the grinder 5 is brought into the state indicated by a line 5b to grind the recessed portion 4 with the outer periphery of the grinder 5. The grinder also grinds the central face 25 with its side surface 52.

While the recessed portion 4 and the central face 25 are being ground, the land portion 24 is ground only at the part thereof toward one end (toward the flute 3) away from the juncture line 44 in FIG. 3, so that the amount by which the land portion is cut away is very small.

When the drill 1 is slightly advanced while being rotated by the angular range of the guide groove 76 through the movement of the handle 83, the land portion 24 and the recessed portion 4 are ground with the outer periphery 51 of the grinder 5, and the central face 25 with the side surface 52 thereof as described above. The land portion 24 is greatly curved at the position of the line 44, and the overall land portion 24 is in the form of a substantially conical peripheral surface with its vertex positioned at the tip center point 20 of the drill.

Since the central edge portions 21 are straight, the drill can be ground easily in this way. Another advantage of the straight central edge portions 21 is that the drill exhibits improved centripetal characteristics during drilling. If the cutting edges are curved spirally around the center shown in FIG. 3, the shape of the edges at the central portion shown in FIG. 1 will be horizontal, with the result that the drill is liable to deflect laterally (crawling phenomenon) during rotation, whereas when these edge portions are straight like the central edge portions 21, the central point (tip) 20 projects outward as seen in FIG. 1, and the locus of rotation of the central edge portions 21 is in the form of a cone (with a very large vertex angle). Consequently, the rotation of the drill entails no lateral deflection, permitting the drill to exhibit improved centripetal characteristics. This enables the drill to form precisely circular holes and smooth inner surfaces defining the bores obtained, hence high accuracy.

When the drill of the above construction is made of high-speed steel, the drill is usable for drilling operation at a feed speed 3 to 5 times as high as is the case with conventional high-speed steel drills which are generally in use.

The drill 1 is made rotatable through one-half the range of rotation of the handle 83 and is therefore accurately rotatable by the handle 83.

Figure 9:
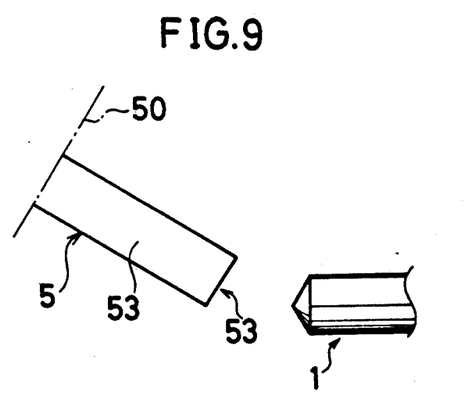
FIG. 9 is a diagram illustrating a rotary grinder as disposed in a different relation to the drill.

Further as seen in FIG. 9, the rotary grinder may have an outer periphery 53 in parallel to its rotary shaft 50. The grinder is then used for grinding with the shaft 50 inclined with respect to the axis of the drill 1. In this case, the cutting face of the central edge portion 21 is ground with the intersection of the side face and the outer periphery of the grinder. The grinder may have an inclined side surface so that the cutting face can be ground with this side surface.

Figure 5A:
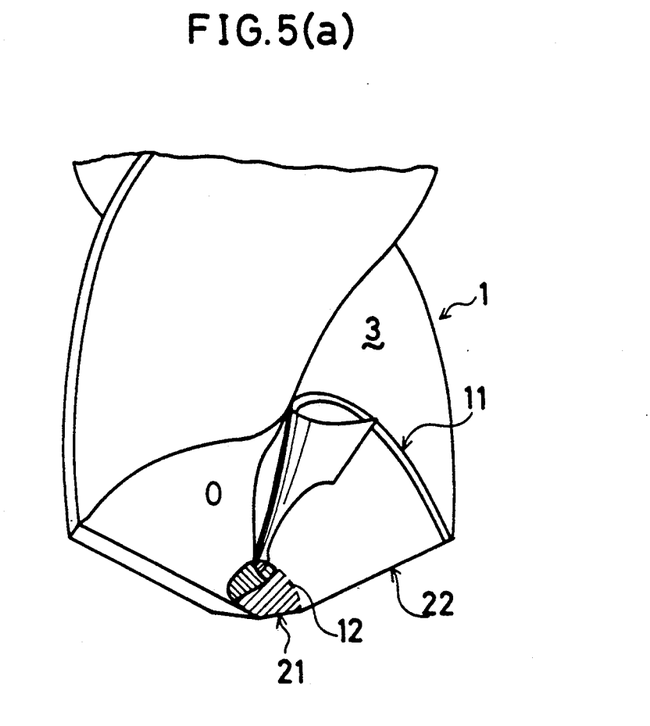
Figure 5B:
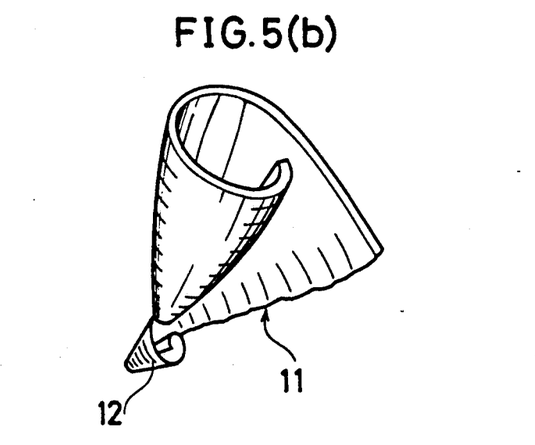

When the drill 1 of the configuration described is used for drilling, the central edge portion 21 and the outer edge portion 22 produce a chip 11 as shown in FIG. 5 (a). The chip portion produced by the outer edge portion 22 stretches along the cutting face 26 and is thereby curved into the form of a large cone having a relatively large wall thickness as seen in FIG. 5 (b), whereas the chip portion 12 (hatched portion shown) extends from the central face 25 along the recess portion 4 to form a small cone of reduced thickness. Thus, the recessed portion 4 provides a space through which the chip portion 12 produced by the central edge portion 21 extends upward. This assures a satisfactory cutting operation.

If the chip portion produced by the central portion is not dischargeable in this way, chips will not be formed smoothly, with the result that the drill encounters increased resistance during cutting and exhibits poor cutting ability in its entirety. Further if increased cutting resistance is offered to the central portion, the central edge portion will be subjected to a great force. Accordingly when the cutting edge is made of cemented carbide, the central edge portion, which is lower in cutting speed than the outer edge portion, is prone to break. With the construction described above, however, the cutting resistance to the central edge portion 21 is small, so that the cutting edge can be made of cemented carbide.

The effect achieved by the presence of the recessed portion can be understood also from FIG. 4. In the absence of the recessed portion 4, the land portion 24 would extend along the phantom line 24a, greatly diminishing the cutting face of the central portion and also greatly decreasing the chip discharging space. In contrast, when the recessed portion 4 is formed, the portion surrounded by the central face 25, the recessed portion 4 and the phantom line 24a provides a space for producing chips. The sufficiently large central face 25 thus formed and the space available give improved cutting ability to the central portion of the drill 1.

After one of the land portions 24 has been ground, the drill 1 is rotated through 180 degrees by the same procedure as already described, and the other land portion is ground in the same manner as above.

As described above, the drill of the invention permits chips to be discharged smoothly from its central portion, is therefore excellent in cutting ability and is adapted to perform a powerful cutting operation since the central edge portion has high strength. Moreover, the drill exhibits excellent centripetal characteristics to form holes or bores with high accuracy. The drill can be ground accurately and easily by the method of the invention using the grinding apparatus of the invention which is simple in construction.

What is claimed is:

1. A drill having an axis of rotation comprising a pair of symmetrically arranged cutting edges formed at one end of a shank, said shank having an outer periphery, each of said cutting edges having a flank followed by a land with a first land portion and a second land portion on opposite sides of a demarcation line and further followed by a discharge flute when viewed from said one end of said shank, each of said cutting edges comprising a central edge portion extending from said axis of rotation and an outer edge portion each extending substantially straight and being joined to each other with an obtuse angle formed therebetween when seen from the direction of feed of the drill, said central edge portion being formed with a central face substantially parallel to the axis of the drill, said first land portion of one of said cutting edges extending from said flank in a direction opposite the direction of rotation of said drill to said demarcation line, said second land portion having an outer end section extending from said outer periphery of said shank and an inner end section extending from said axis of rotation, said inner end section extending from said demarcation line to the central face of the central edge portion of the other symmetrical cutting edge, a phantom cutting plane extending parallel to the axis of the drill and extending substantially perpendicularly through an intermediate part of said central edge portion, said first land portion and said second land portion being intersected by said cutting plane, said cutting plane intersecting said second land portion at a first line of intersection, said first line of intersection being disposed at a first angle relative to said central face, said cutting plane intersecting said first land portion at a second line of intersection, said second line of intersection when continued by a phantom line to said central face being disposed at a second angle relative to said central face, said second angle being greater than said first angle.

2. A drill as defined in claim 1 wherein the angle formed between said outer edge portion and said central edge portion at their junction is in the range of 110 to 150 degrees.

3. A drill as defined in claim 1, wherein said second land portion forms a substantially partial conical surface having its vertex at the center of the drill tip.

4. A drill according to claim 1, wherein said central face is a flat face.

5. A drill according to claim 1, wherein said demarcation line between said first land portion and said second land portion extends along a substantially straight line when seen from the direction of feed of the drill.

6. A drill according to claim 5, wherein said substantially straight line ext ends to the axis of said drill.

7. A drill according to claim 1, wherein the central edge portion of one cutting edge is disposed at 180° angle with respect to the central edge portion of the other cutting edge, each of said central edge portions extending to the axis of said drill.

8. A drill according to claim 1, wherein each of said central faces is a flat face disposed in a common diametrical plane which contains said axis.

9. A drill having an axis of rotation comprising a pair of symmetrically arranged cutting edges formed at one end of a shank, said shank having an outer periphery, each of said cutting edges having a flank followed by a land with a first land portion and a second land portion on opposite sides of a demarcation line and further followed by a discharge flute when viewed from said one end of said shank, each of said cutting edges comprising a central edge portion extending from said axis of rotation and an outer edge portion, said central edge portion being formed with a central face substantially parallel to the axis of the drill, said first land portion of one of said cutting edges extending from said flank in a direction opposite the direction of rotation of said drill to said demarcation line, said second land portion having an outer end section extending from said outer periphery of said shank and an inner end section extending from said axis of rotation, said inner end section extending from said demarcation line to the central face of the central edge portion of the other symmetrical cutting edge, said first land portion and said second land portion being intersected by a phantom cutting plane which extends parallel to said axis of the drill and which extends substantially perpendicularly through an intermediate part of said central edge portion, said cutting plane intersecting said second land portion at a first line of intersection, said first line of intersection being disposed at a first angle relative to said central face, said cutting plane intersecting said first land portion at a second line of intersection, said second line of intersection when continued by a phantom line to said central face being disposed at a second angle relative to said central face, said second angle being greater than said first angle.

10. A drill according to claim 9, wherein said first land portion is in the form of a substantially conical surface with its vertex positioned at the forward axial tip of the drill.

11. A method of improving the cutting ability of a drill having an axis of rotation by providing central cutting edge portions of the drill with high strength while providing for smooth discharge of chips, said drill being of the type having symmetrically arranged cutting edges at one end of a shank having an outer periphery and with each of said cutting edges having a flank followed by a land with a first land portion and a second land portion on opposite sides of a demarcation line and further followed by a discharge flute when viewed from the direction of feed of the drill, each of said cutting edges also having a central edge portion extending from said axis of rotation and an outer edge portion and wherein the central edge portions are each formed with a central face substantially parallel to the axis of the drill, the steps of forming a second land portion at the trailing end portion of the land of one cutting edge with said second land portion having an outer end section extending from said outer periphery of said shank and an inner end section extending from said axis of rotation and further with said second land portion extending to the central face of the central edge portion of the other symmetrical cutting edge and thereby providing an increased area to said central face and improving the cutting ability of the drill while providing the central cutting edge portion with high strength and enhanced chip discharge capability, said step of forming said second land portion thereby dividing said land into two portions disposed on opposite sides of a demarcation line, one of said two land portions being designated a first land portion, the other of said two land portions being said second land portion, said first land portion and said second land portion being intersected by a phantom cutting plane which extends parallel to said axis of the drill and which extends substantially perpendicularly through an intermediate part of said central edge portion, said cutting plane intersecting said second land portion at a first line of intersection, said first line of intersection being disposed at a first angle relative to said central face, said cutting plane intersecting said first land portion at a second line of intersection, said second line of intersection when continued by phantom line to said central face being disposed at a second angle relative to said central face, said second angle being greater than said first angle.

12. A method according to claim 11 further comprising forming said outer edge portion and said central edge portion to be disposed at an angle relative to each other of from 110° to 150°.

13. A method according to claim 11 further comprising forming said second land portion as a partial conical surface having its vertex at the axis of the drill.

14. A drill having an axis of rotation, an outer peripheral surface, and a drill tip, comprising a pair of symmetrically arranged cutting edges formed at one end of a shank, each of said cutting edges having a flank followed by a land means, said land means having a first land portion and a second land portion on opposite sides of a demarcation line, said demarcation line being a straight line extending from the axis of said drill to said peripheral surface, each of said cutting edges comprising a central edge portion extending from said axis of rotation and an outer edge portion each extending substantially straight and being joined to each other with an obtuse angle formed therebetween when seen from the direction of feed of the drill, said central edge portion being formed with a central flat face substantially parallel to the axis of the drill, the central edge portion of one cutting edge being disposed at an 180° angle with respect to the central edge portion of the other cutting edge, said first land portion of one of said cutting edges extending from said flank in a direction opposite the direction of rotation of said drill to said demarcation line, said second land portion extending from said demarcation line to the central face of the central edge portion of the other symmetrical cutting edge, said second land portion forming a substantially partial conical surface having its vertex disposed at the center of said drill tip, a phantom cutting plane extending parallel to the axis of the drill and extending substantially perpendicularly through an intermediate part of said central edge portion, said first land portion and said second land portion being intersected by said phantom cutting plane, said phantom cutting plane intersecting said second land portion at a first line of intersection, said first line of intersection being disposed at a first angle relative to said central face, said cutting plane intersecting said first land portion at a second line of intersection, said second line of intersection when continued by a phantom line to said central face being disposed at a second angle relative to said central face, said second angle being greater than said first angle, whereby said central edge portions of said cutting edges having enhanced strength while providing for enhanced chip discharge.

* * * * *